United States Patent [19]

Overbergh

[11] Patent Number: 4,965,320

[45] Date of Patent: Oct. 23, 1990

[54] POLYETHYLENE ALKYL ACRYLATE ADHESIVE COMPOSITION

[75] Inventor: Noel M. M. Overbergh, Rotselaar, Belgium

[73] Assignee: Raychem Corporation, Menlo Park, Calif.

[21] Appl. No.: 316,006

[22] Filed: Feb. 27, 1989

[30] Foreign Application Priority Data

Feb. 25, 1988 [GB] United Kingdom ................ 8804408

[51] Int. Cl.$^5$ ...................... C08L 23/08; C08L 35/02; C08L 33/08
[52] U.S. Cl. .................................... 525/207; 525/149; 525/179
[58] Field of Search ........................ 525/207, 149, 179

[56] References Cited

U.S. PATENT DOCUMENTS 3,485,783 12/1969 Kehe .................................. 525/221
4,237,037 12/1980 Tahahashi ........................... 525/301
4,275,180 6/1981 Clarke ................................. 525/173

FOREIGN PATENT DOCUMENTS 168139 1/1986 European Pat. Off. .

Primary Examiner—Carman J. Seccuro
Attorney, Agent, or Firm—A. Stephen Zavell; Herbert G. Burkard

[57] ABSTRACT

A hot-melt adhesive composition which comprises a mixture of:
(a) 25–40 parts by weight of a polyethylene alkyl acrylate terpolymer containing maleic anhydride and having a melt flow index as determined according to ASTM D1238-70 of at least 40; and
(b) 25–70 parts by weight of a polyethylene alkyl acrylate copolymer having a melt flow index as determined according to ASTM D1238-70 of at least 40.

21 Claims, No Drawings

POLYETHYLENE ALKYL ACRYLATE ADHESIVE COMPOSITION

The present invention relates to an adhesive, particularly a hot-melt, composition comprising a blend of polyethylene alkyl acrylates. The adhesive is especially useful in the cable accessories and pipeline industries for bonding to polyethylene and lead etc.

Environmental protection frequently has to be provided around substrates such as cables to protect them from contaminants such as moisture. An excellent way to provide such protection is to surround the substrate with an adhesive composition, conveniently applied as a coating on a dimensionally-recoverable, preferably heat-shrinkable sleeve. Such a sleeve may be positioned around the substrate and heated, causing the adhesive composition to become molten or softened and causing the sleeve to shrink, driving the adhesive into bonding engagement with the substrate. The sleeve itself may, of course, provide environmental protection, and the quantity of adhesive required may be reduced by coating the sleeve only at its edges to provide a bond to the substrate.

A specific instance where environmental protection is required is around a cable splice, particularly in multi-core telecommunications cables, where missing cable sheath (removed in order to form the splice) has to be made good. This may be done by installing a liner around the splice, the liner preferably being shaped to provide a smooth transition between the bulky splice and the smaller diameter cable or cables that enter and leave it. The liner is then surrounded by a heat-recoverable sleeve that extends past each end of the liner down onto intact cable jacket. The sleeve is internally coated with a hot-melt adhesive composition and, when heated, it shrinks down and becomes bonded to each cable jacket and the liner between them. In this way leak paths from the outside environment into the now formed splice case are avoided, and the conductors of the cable protected from moisture etc.

Such splice cases may be expected to provide an environmental barrier for the lifetime of the cable, say at least twenty-five years. The cable, and splice case, may be subjected to temperature variations ranging from say $-40°$ C. in winter to say $+70°$ C. in the case of a cable exposed to direct sunlight, and the cable may be internally pressurized. As will be appreciated, these requirements of lifetime, temperature and pressure put severe demands on the performance of the adhesive. The problem is made more difficult because, for practical purposes, a given product may have to be suitable for many different environments, for example around buried cables in cold countries, and aerial cables in hot countries.

These performance requirements are themselves difficult to achieve at an acceptable price, but the difficulty can be seen to be particularly acute when one considers installation conditions. Installation is at present carried out by heating the sleeve and consequently the adhesive with an open-flame torch, although electrical heating may be used. It is clearly desirable that the amount of heat required to soften the adhesive be kept to a minimum. The weather may be cold, there may be little room in a man-hole for vigorous heating, an electrical heater may have limited power, and the cable or the sleeve may be damaged by high temperatures etc. Thus, there is a maximum acceptable installation temperature.

Also, as noted above there is a wide temperature range over which the adhesive must retain its adhesive power. Unfortunately, the maximum allowable installation temperature is not very much higher than the minimum acceptable upper limit to the range of service temperatures. We have therefore found that our adhesive should have a sharp melt transition.

In addition to a sharp melt transition, the adhesive should have a high peel strength to polyethylene, preferably non-flame-brushed as well as flame-brushed, and to lead, it should have good low temperature impact strength and low temperature flexibility, and it should have low viscosity at the installation temperature, say at $160°$ C.

Attempts have been made to formulate adhesive compositions that provide certain specific benefits, and the following prior art compositions based on polyethylene alkyl acrylates ma be mentioned.

U.S. Pat. No. 4,252,858 (Chao, assigned to Raychem) discloses a hot-melt adhesive comprising an ethylene copolymer, a fluorocarbon elastomer and a tackifier. The copolymer may be the terpolymers of ethylene, ethylacrylate and methacrylic acid known by the trade marks DPD 6169 and DPD 6181. They have very low melt flow indices of about 6.

U.S. Pat. No. 3,983,070 (Penneck, assigned to Raychem) discloses an adhesive comprising a polar copolymer of an alpha-olefin (for example ethylene ethyl acrylate) or a mixture of such copolymers and a chemically treated silica filler. Additives may be provided to achieve the desired flow properties. An example of the ethylene ethylacrylate given is that known by the trade mark DPD 9169, which has a low melt flow index of about 20.

U.S. Pat. No. 4,374,231 (Doucet, assigned to Raychem) discloses a polyamide adhesive that includes an ethylene, acrylic acid, butyl acrylate terpolymer, with low melt flow indices.

G.B. 2,111,065 (Raychem) discloses a hot-melt adhesive composition comprising a copolymer of ethylene, such as ethylene vinylacetate mixed with a copolymer such as ethylene butyl acrylate or ethylene, butyl acrylate, acrylic acid terpolymer, with low melt flow indices.

U.S. Pat. No. 3,485,783 (Kehe, assigned to Continental Can Co.) discloses a hot-melt adhesive comprising a mixture of an ethylene alkyl acrylate (which alkyl acrylate may be ethyl acrylate or butyl acrylate), an ethylene acrylic acid copolymer and a polymerized rosin ester.

U.S. Pat. No. 4,332,655 (Bereijka, assigned to Raychem) discloses a hot-melt adhesive comprising a blend of an adhesive ethylene copolymer, such as ethylene ethyl acrylate or ethylene butyl acrylate, and an elastomeric olefin having a saturated backbone. A wide range of melt indices for the adhesive ethylene copolymer is envisaged.

G.B. 1,581,559 (Raychem) discloses an adhesive composition comprising an adhesive copolymer cross-linked by irradiation, and an aromatic tackifier. The copolymer may be that known by the trade mark DPD 6181, an ethylene ethyl acrylate copolymer of low melt flow index.

U.S. Pat. No. 4,146,521 (Godfrey, assigned to Eastman Kodak) discloses a hot-melt adhesive comprising polyethylene, an ethylene lower alkyl acrylate copolymer, a tackifier and a wax. The copolymer may be ethylene ethyl acrylate having a low melt flow index (2-30) or ethylene butyl acrylate.

G.B. 1,041,065 (Union Carbide) discloses an adhesive comprising an olefin high polymer having a melt index of less than 1000 (preferably less than 100) and an ethylene, acrylic acid terpolymer the third monomer of which may be ethyl acrylate or butyl acrylate. The terpolymers have a melt flow index of less than 1000, preferably less than 100.

I have now formulated an inexpensive novel adhesive composition based on polyethylene alkyl acrylate copolymers and terpolymers, particularly those including ethyl and/or butyl acrylates, that provides excellent low temperature flexibility and good adhesion to cable substrates and having the appropriate flow characteristics to ensure good installability to heat-shrinkable articles. Unlike the prior art referred to above, the present invention combines polyethylene alkyl acrylate terpolymers and copolymers and optionally a tackifier. These ingredients will generally be extrusion mixable from pellet form, thus facilitating manufacture.

Thus, the present invention provides a hot-melt adhesive composition comprising a mixture of:

(a) 25–40 parts by weight of a polyethylene alkyl acrylate terpolymer containing maleic anhydride and having a melt flow index as determined according to ASTM D1238-70 of at least 40 and preferably having an acid index of from 11–19 (mg KOH per g by titration); and (b) 25–70 parts by weight of a polyethylene alkyl acrylate copolymer having a melt flow index as determined according to ASTM D1238-70 of at least 40.

The terpolymer (a) is preferably a terpolymer of ethylene, ethyl and/or butyl (preferably ethyl) acrylate and maleic anhydride; and the copolymer (b) is preferably a copolymer of ethylene and ethyl and/or butyl (preferably butyl) acrylate. Other alkyl acrylates, particularly lower (especially C1-6, typically C2-5) acrylates may, however, be used.

The copolymer (b) consists essentially of ethylene and one or more (preferably one) alkyl acrylate, there preferably being no third comonomer present. Any third comonomer is preferably present as less than 5 mole %, more preferably less than 2 mole %, especially less than 1 mole %. Similarly, the terpolymer preferably consists essentially of the three specified monomers, any fourth preferably being present as less than 5 mole %, more preferably less than 2 mole %, especially less than 1 mole %.

The adhesive composition may usefully be used in conjunction with, preferably supplied as a coating on, a heatrecoverable article. The heat-recoverable article may comprise an extended continuum, or it may comprise a composite material for example one shrinkable by virtue of a shrinkable fibre component thereof. Preferred composite materials comprises shrinkable fibres and a polyethylene matrix material to which the adhesive composition is bonded. The adhesive thus may be used to form a bond between the polyethylene matrix and a polyethylene cable jacket. In one embodiment, the composite material comprises a shrinkable fabric of shrinkable high density polyethylene (preferably weft) and glass fibres (preferably warp) together with a low density polyethylene matrix, and optionally incorporating a strengthening or moisture barrier layer in the form of a thin aluminum or other metal foil.

Such a composite or other recoverable article is preferably in the form of a tubular or wrap-around sleeve, and may be used to provide environmental protection around a pipe or cable, for example, a cable splice. Where a branched cable splice is to be sealed, a branch-off clip such as that disclosed in G.B. 1,604,981 may be used to bring or maintain together circumferentially-separated portions of the sleeve between the branching cables. The clip may comprise three legs, one of which is positioned within the sleeve, and may comprise an adhesive composition of the invention.

The composition of the invention may additionally comprise a flow-temperature or viscosity-modifying agent. Examples include tackifiers, waxes, modified waxes, polyisobutylene and that known by the Monsanto trade mark, Santicizer (e.g. N-ethyl o- and p-toluene sulphonamides) and equivalents. In general, ingredients that increase viscosity are preferably avoided. Furthermore, I prefer that the composition is not subjected to cross-linking, particularly is not irradiated. The term "tackifier" is used in the adhesives art to mean a material which when added to an adhesive promotes its adhesion to a substrate, by increasing its ability to wet the substrate. Examples of tackifiers include low molecular weight polymers of monomers that contain ethylenic unsaturation and are free of polar groups. Specific examples include Nevpene 9500 (trade mark) which is believed to be a copolymer of a mixture of aromatically- and aliphatically-substituted ethylene, and Piccotex 75 (trade mark of Industrial Chemical Corp.) which is believed to be a copolymer of vinyl toluene and alpha-methylstyrene. Preferred tackifiers, however, comprise terpene phenolic resins such as SP 553 (trade mark, Schenectady Corp.) and Nevillac Hard (trade mark of Neville), particularly the former. The tackifier preferably has a Brookfield viscosity at 160° C. of 80-1500 centipoises; a ring-and-ball softening point as determined according to ASTM E-28 of 50-130° C., more preferably 80°-120° C., or preferably 110°-120° C., particularly about 115° C; and a molecular weight of less than 3000.

Given the basic components of the composition of the invention, the skilled man after reading this specification will be able to choose a tackifier or other flow-temperature or viscosity-modifying agent to achieve the desired properties, namely one or more of:

(a) a ring-and-ball softening point as determined according to ASTM E-28 of from 90°-110° C., preferably 95°-105° C.;

(b) a viscosity as determined according to ASTM D3236 at 160° C. of from 40-110 Pa.s, preferably 60-90 Pa.s.;

(c) a viscosity as determined according to ASTM D3236 at 200° C of from 10-50, preferably 15-40 Pa.s, more preferably 20-35 Pa.s;

(d) an impact brittleness as determined according to ISO 974 of less than −30° C., preferably less than −35° C.; and (e) a peel strength to non-flame-brushed and/or flamebrushed polyethylene as determined according to QAPK K027 of greater than 150 N/25 mm, preferably greater than 200 N/25 mm, especially greater than 250 N/25 mm.

I have found that all of these properties can be achieved using the above defined mixture of polyethylene alkyl acrylates, each of high melt flow index, together with from 5-15, preferably 10-15, parts by weight of SP 553 or equivalent as tackifier. The use of alternative tackifiers or alternative quantities will in general allow chosen ones of the above properties t be achieved.

For some purposes it may be desirable to add small quantities of one or more polyamides to the mixture. A suitable polyamide is one having an amine number below 5, preferably below 4. For example up to 15 parts by weight of a polyamide may be added, although I have found that satisfactory properties can be achieved at lower cost with less than 5 parts by weight of, and preferably substantially without, polyamide.

I prefer that the polyethylene alkyl acrylate terpolymer has a melt flow index as defined of at least 70, more preferably from 100–300. This terpolymer may, for example, comprise: a terpolymer of ethylene; ethyl acrylate and/or butyl acrylate (preferably ethyl acrylate); and maleic anhydride. It preferably has a ring-and-ball softening point as determined according to ASTM E-28 of 80°–125° C., more preferably 95°–120° C. Its viscosity as determined according to ASTM D3236 at 160° C. is preferably from 120–140 Pa.s. Preferred terpolymers include that known by the trade mark Lotader 8200 (Companie de France), and equivalents.

The polyethylene alkyl acrylate copolymer preferably has a melt flow index as defined of at least 70, more preferably 100–300. It preferably has a ring-and-ball softening point as determined according to ASTM E28 of 80°–125° C., more preferably 90°–115° C. Its viscosity as determined according to ASTM D3236 at 160° C. is preferably from 70–150 Pa.s. Preferred copolymers include polyethylene butyl acrylates such as that known by the trade mark Lotader HX-8280 (Companie de France), and equivalents, and polyethylene ethyl acrylates such as those known by the trade marks Alathon 704 (DuPont) and EA 89821 (USI), and equivalents.

The composition preferably has:
(a) 28–38 parts by weight of the polyethylene alkyl acrylate terpolymer; and
(b) 55–70 parts by weight of said polyethylene alkyl acrylate copolymer.

I prefer that the composition consist essentially of the polyethylene alkyl (preferably ethyl) acrylate terpolymer, the polyethylene alkyl (preferably butyl) acrylate copolymer, the tackifier and optionally, the polyamide. Preferably any other component is present as less than 10 parts by weight, more preferably less than 5 parts by weight, especially less than 2 parts by weight. Examples of permissible minor components include stabilizers such as antioxidants, a preferred amount of which is about 1 part by weight. In particular I prefer that the composition contains substantially no vinyl acetate nor copolymer thereof The invention is further illustrated by the following examples.

EXAMPLE 1

The following ingredients, the first two at least initially in pellet form, were mixed for 45 minutes in a mixer at 210° C.:
30 parts by weight of Lotader 8200
59 parts by weight of Lotader HX 8280
10 parts by weight of Tackifier SP553
1 part by weight of antioxidant.

The resulting composition had a viscosity as determined according to ASTM D3236 at 160° C. of 74 Pa.s, and at 200° C. of 25 Pa.s. Its ring-and-ball softening point as determined according to ASTM E28 was 102° C., and its impact brittleness (ISO 974) was −38° C.

The composition was coated onto a heat-shrinkable sleeve having a polyethylene surface, and the coated sleeve was bonded, using the composition of the invention, to the following substrates, the following peel strengths (QAPK K027) being recorded:

| | |
|---|---|
| flame-brushed polyethylene (21° C.) | 258 N/25 mm |
| non-flame-brushed polyethylene (21° C.) | 260 N/25 mm |
| Lead (21° C.) | 350 N/25 mm |
| Aluminum (21° C.) | 258 N/25 mm |
| flame-brushed polyethylene (50° C.) | 31 N/25 mm |
| flame-brushed polyethylene (60° C.) | 14 N/25 mm |

EXAMPLE 2

Example 1 was repeated, but using the following ingredients:

| | |
|---|---|
| Lotader 8200 | 35 parts by weight |
| Lotader HX 8280 | 59 parts by weight |
| Tackifier SP553 | 15 parts by weight |
| Antioxidant | 1 part by weight. |

The composition had a viscosity (ASTM D3236) at 160° C. of 68 Pa.s., and at 200° C. of 25 Pa.s. Its ring-and-ball softening point (ASTM E28) was 102° C., and its low temperature impact brittleness (ISO 924) was −30° C.

The composition when applied to a shrinkable sleeve having a polyethylene surface was tested for peel strength (QAPK K027), and the results were 282 N/25 mm to flamebrushed polyethylene at 21° C, and 251 N/25 mm to non-flamebrushed polyethylene at 21° C.

EXAMPLE 3

Example 1 was repeated, but using the following ingredients:

| | |
|---|---|
| Polyamide with amine number below 4 | 5 parts by weight |
| Lotader 8200 | 30 parts by weight |
| Lotader HX8280 | 64 parts by weight |
| Tackifier SP553 | 15 parts by weight |
| Antioxidant | 1 part by weight |

The composition had a viscosity (ASTM D3236) at 160° C. of 87 Pa.s., and at 200° C. of 30 Pa.s. Its ring-and-ball softening point (ASTM E28) was 105° C., and its low temperature impact strength (ISO 974) was −30° C.

The composition when applied to a shrinkable sleeve having a polyethylene surface was tested for peel strength (QAPK K027) and the results were 233 N/25 mm to flame-brushed polyethylene at 21° C., and 229 N/25 mm to non-flame-brushed polyethylene at 21° C.

I claim:

1. A hot-melt adhesive composition which is not crosslinked, comprising a mixture of:
   (a) 25–40 parts by weight of a terpolymer of ethylene, alkyl acrylate and maleic anhydride and having a melt flow index as determined according to ASTM D1238-70 of at least 40; and
   (b) 25–70 parts by weight of a copolymer consisting essentially of ethylene and alkyl acrylate having a melt flow index as determined according to ASTM D1238-70 of at least 40.

2. An adhesive composition according to claim 1, in which the terpolymer (a) comprises an ethyl acrylate and/or a butyl acrylate containing terpolymer.

3. An adhesive composition according to claim 1, in which the copolymer (b) comprises an ethyl acrylate and/or a butyl acrylate containing copolymer.

4. An adhesive composition according to claim 1, in which the terpolymer (a) comprises an ethyl acrylate containing terpolymer and copolymer (b) comprises a butyl acrylate containing copolymer.

5. An adhesive composition according to claim 1, which additionally comprises:
   (c) from 5 to 15 parts by weight of a flow-temperature or viscosity-modifying agent.

6. An adhesive composition according to claim 4 having:
   (a) 28-28 parts by weight of said terpolymer; and
   (b) 55-70 parts by weight of said copolymer.

7. An adhesive composition according to claim 1, in which the melt flow index of terpolymer (a) and/or of copolymer (b) is at least 70.

8. An adhesive composition according to claim 1, which additionally comprises:
   (d) up to 15 parts by weight of a polyamide.

9. An adhesive composition according to claim 1, in which the terpolymer (a) has a ring-and-ball softening point as determined according to ASTM E28 of 80°-125° C.

10. An adhesive composition according to claim 1, in which the copolymer (b) has a ring-and-ball softening point as determined according to ASTM E28 of 80°-125° C.

11. An adhesive composition according to claim 5, in which the modifying agent has a ring-and-ball softening point as determined according to ASTM E-28 of 80°-120° C.

12. An adhesive composition according to claim 5, in which the modifying agent comprises a tackifier.

13. An adhesive composition according to claim 12, in which the tackifier comprises a terpene phenolic resin.

14. An adhesive composition according to claim 1 having a ring-and-ball softening point as determined according to ASTM E-28 of from 90°-110° C.

15. An adhesive composition according to claim 1, having a viscosity as determined according to ASTM D3236 at 160° C. of from 40-110 Pa.s.

16. An adhesive composition according to claim 1, having a viscosity as determined according to ASTM D3236 at 200° C. of 15-40 Pa.s.

17. An adhesive composition according to claim 1, having an impact brittleness as determined according to ISO 974 of less than −30° C.

18. An adhesive composition according to claim 1, exhibiting a peel strength to non-flame-brushed polyethylene and/or flame-brushed as determined according to QAPK K027 of greater than 150 N/25 mm at 21° C.

19. An adhesive composition according to claim 1, that contains substantially no vinyl acetate nor copolymer thereof.

20. An adhesive composition according to claim 1, that consists essentially of said terpolymer (a), said copolymer (b), a tackifier and optionally a polyamide.

21. An adhesive composition according to claim 20, containing substantially no polyamide.

* * * * *

UNITED STATES PATENT AND TRADEMARK OFFICE
CERTIFICATE OF CORRECTION

PATENT NO. : 4,965,320
DATED : October 23, 1990
INVENTOR(S) : Noel M.M. Overbergh It is certified that error appears in the above-indentified patent and that said Letters Patent is hereby corrected as shown below:

Column 2, line 18 replace "ma" by --may--.
Column 3, line 52 replace "heatrecoverable" by --heat-recoverable--.
Column 3, line 56 replace "comprises" by --comprise--.
Column 5, line 1 replace "t" by --to--.
Column 5, line 52 replace "thereof" by --thereof.--.

Claim 6, line 3 (Column 7, line 17) replace "28-28" by --28-38--.

Signed and Sealed this

Eighth Day of August, 1995

Attest:

BRUCE LEHMAN

*Attesting Officer*     *Commissioner of Patents and Trademarks*